United States Patent [19]

Hirota et al.

[11] Patent Number: 4,507,687

[45] Date of Patent: Mar. 26, 1985

[54] HORIZONTAL SYNC PULSE CONTROL CIRCUIT FOR VIDEO TAPE RECORDER UTILIZING PULSE CODE MODULATION

[75] Inventors: Yutaka Hirota; Takashi Eguchi, both of Osaka, Japan

[73] Assignee: Matsushita Electric Industrial Co., Ltd., Osaka, Japan

[21] Appl. No.: 409,552

[22] Filed: Aug. 19, 1982

[30] Foreign Application Priority Data

Aug. 28, 1981 [JP] Japan ............................. 56-135716

[51] Int. Cl.$^3$ ............................................... H04N 5/91
[52] U.S. Cl. ..................................... 358/335; 358/142
[58] Field of Search ............... 358/310, 319, 327, 328, 358/335, 336–340, 148, 342, 145, 142; 360/33.1, 37.1, 39

[56] References Cited

U.S. PATENT DOCUMENTS

| | | | |
|---|---|---|---|
| 3,449,717 | 6/1969 | Smith et al. ............................ | 371/70 |
| 3,978,284 | 8/1976 | Yoshino et al. ....................... | 358/143 |
| 4,409,627 | 10/1983 | Eto et al. ........................... | 358/336 X |
| 4,417,283 | 11/1983 | Hoshimi et al. ..................... | 358/335 X |

FOREIGN PATENT DOCUMENTS

| | | | |
|---|---|---|---|
| 55-49079 | 4/1980 | Japan .................................. | 358/335 |
| 3479 | 1/1982 | Japan .................................. | 358/148 |

Primary Examiner—Aristotelis M. Psitos
Attorney, Agent, or Firm—Burgess, Ryan & Wayne

[57] ABSTRACT

A horizontal sync pulse control circuit for a video tape recorder of the type utilizing pulse code modulation in a standard format, where there is a fixed time interval between each horizontal sync pulse and the beginning of the data pulse train for the corresponding video line. Delay circuitry and associated signal process circuitry is used to monitor this time interval. When the monitored time interval between the horizontal sync pulse and the first data pulse for the corresponding line differs from the correct time interval by one bit or less, the position of the horizontal sync pulse is re-synchronized utilizing a clock locked to the video signal. When the interval between the horizontal sync pulse and the first data pulse of the corresponding line exceeds one bit, the horizontal sync pulse is blanked, so that noise which would otherwise be produced by an incorrect horizontal sync pulse is eliminated.

10 Claims, 25 Drawing Figures

DATA BLOCK CONTROL CIRCUIT

FIG. 13

VERTICAL SYNC SIGNAL DETECTION CIRCUIT

FIG. 14 VERTICAL SYNC SIGNAL/EQUALIZING PULSE SIGNAL CONTROL CIRCUIT

HORIZONTAL SYNC PULSE CONTROL CIRCUIT FOR VIDEO TAPE RECORDER UTILIZING PULSE CODE MODULATION

BACKGROUND OF THE INVENTION

The present invention relates to a horizontal sync pulse control circuit for a PCM signal recording and reproducing apparatus which utilizes at least in part a video tape recorder (will be termed VTR hereinafter) for recording and reproducing a PCM signal conformable to the television signal standard.

Common PCM signal recording and reproducing apparatus are designed to utilize at least in part VTRs for recording and reproducing PCM signals conformable to the television signal standards respectively.

The PCM signal recording and reproducing apparatus referred to herein is of the type which modulates analog audio signals to PCM signals conforming to television signal standards, records the PCM signals on a VTR tape by means of a VTR head, modulates the PCM signals reproduced from the VTR tape into the analog audio signals, and reproduces the analog audio signals. In such an apparatus, a scratch or a piece of dust on the recording medium, i.e., the VTR tape, causes a dropout of record, giving rise to an erroneous reproduction of the signal. When errors occur in the reproduced data signal within a certain degree of probability, they can be retrieved perfectly by use of error correction bits, as is known in the art, and there is no practical problem. However, if an error occurs on the synchronizing (sync) signal, there is no way to retrieve it, resulting in a failure of synchronization in the PCM signal processing circuit and thus in generation of noise. In the PCM signal recording and reproducing apparatus of this type, data is rearranged in time by the interleaving operation in recording, and the original arrangement is restored by the de-interleaving operation in reproduction. In this case, when the horizontal sync signal is disturbed, it fails to maintain the correct timing relationship with the PCM data signal, resulting in a failure of reproduction for the data signal during the period of 245 horizontal sync signals. In consequence, substantial noise is created in the de-interleaving operation and the error correcting operation for the data signal.

SUMMARY OF THE INVENTION

It is an object of the present invention to provide a PCM signal recording and reproducing apparatus, wherein a false horizontal sync signal caused by a dropout of record or the like is retrieved so as to prevent the failure of synchronization in the PCM signal processing system and thereby to prevent the occurrence of noise in the reproducing operation.

The present invention provides a PCM signal recording and reproducing apparatus, wherein the timing relationship between the horizontal sync signal and the data signal is verified and when the horizontal sync signal is determined to be correct, it is directly transferred to the signal processing system; when the horizontal sync signal is determined to be false within a certain allowable range, it is retrieved and transferred to the signal processing system; and when the horizontal sync signal is determined to be false in excess of the range, allowable reproduced horizontal sync signal is eliminated, whereby in any case noise caused by a false horizontal sync signal can be prevented during the reproducing operation.

DESCRIPTION OF THE PREFERRED EMBODIMENT

First, the PCM signal format, that is stated in the civil appliance PCM encoder/decoder technical file authorized by Electronics Industries Association of Japan, will be described with reference to FIGS. 1A to 1D and FIGS. 2A to 2C.

Figure 1A:
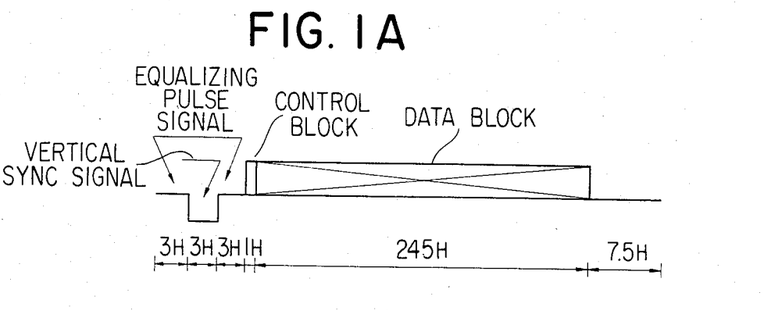
FIGS. 1A through 1D and 2A through 2C are diagrams showing the PCM signal format.
Figure 1B:
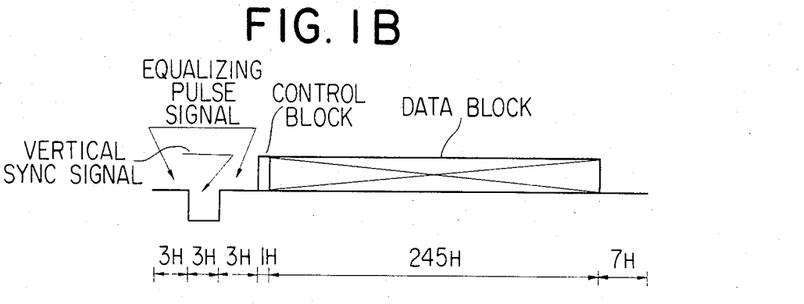
Figure 1C:
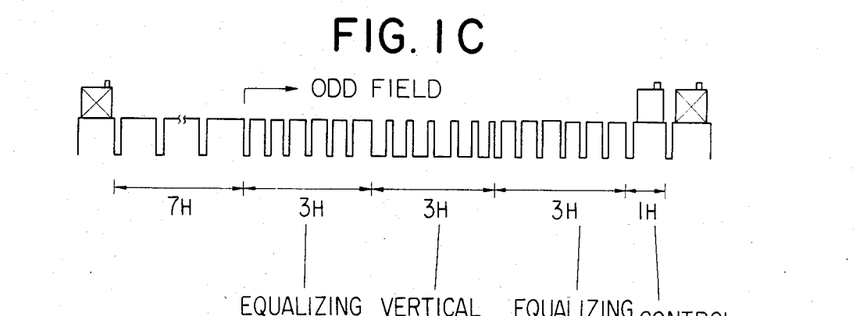
Figure 1D:
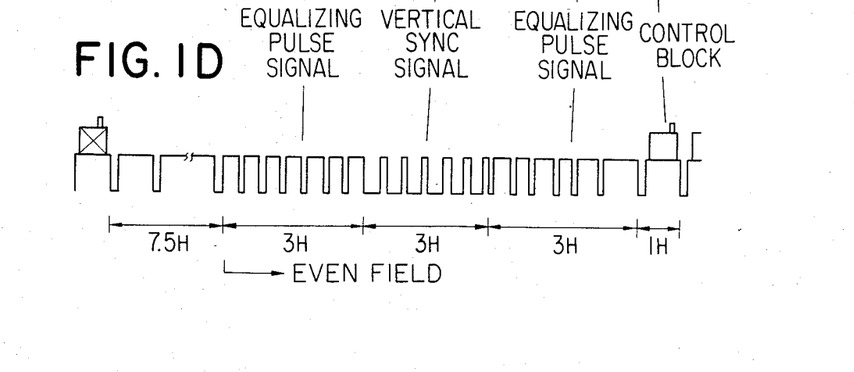

FIGS. 1A and 1B show signal arrangements for an odd field and an even field, respectively, each including a 3H vertical sync signal (H signifies the interval between horizontal signals), two 3H equalizing pulse signals preceding and following the vertical sync signal, a 1H control block, and a 245H data block. The next equalizing pulse signal will appear on expiration of 7.5H time following the end of the PCM data signal in the case of the odd field shown in FIG. 1A, or on expiration of 7H time following the end of the PCM data signal in the case of the even field shown in FIG. 1B. FIGS. 1C and 1D show in detail the vertical sync signals and equalizing pulse signals shown in FIGS. 1A and 1B, respectively.

Figure 2A:
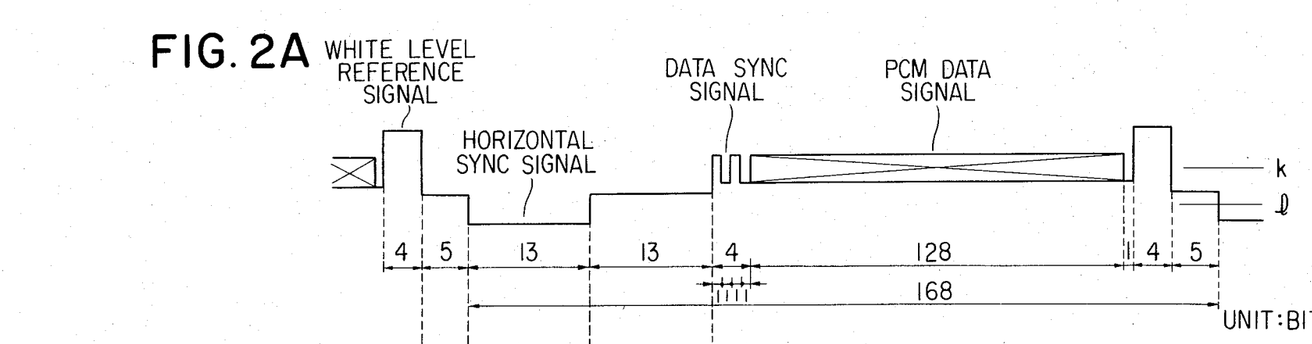

FIG. 2A shows a bit arrangement of the horizontal signal section of the PCM signal. The signal format begins with a 4-bit white level reference signal, and it is followed by a 13-bit horizontal sync signal with 5-bit spacing, a 4-bit data sync signal ("1010") with 13-bit spacing, and a 128-bit PCM data signal, which is then followed by the next white level reference signal with 1-bit spacing provided therebetween. Accordingly, a complete horizontal signal is made up of 168 bits.

Figure 2B:
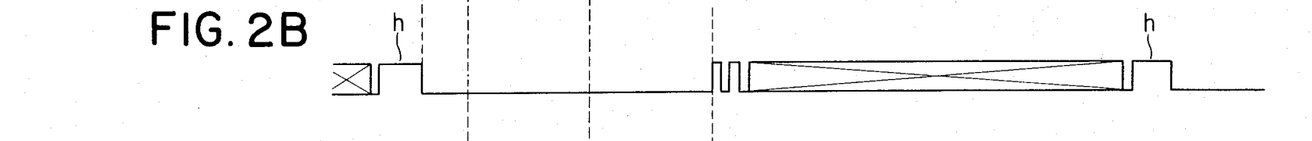
Figure 2C:
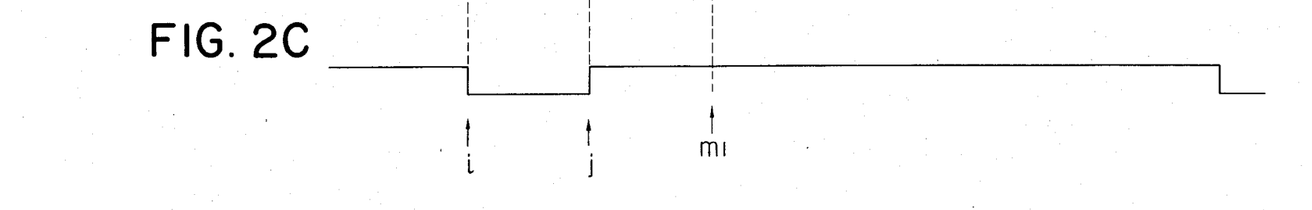

FIGS. 2B and 2C show the data signal obtained by slicing the PCM signal shown in FIG. 2A at level k and the sync signal obtained by slicing the PCM signal at level l, respectively. The sliced data signal includes a PCM data signal and a data sync signal.

Figure 3:
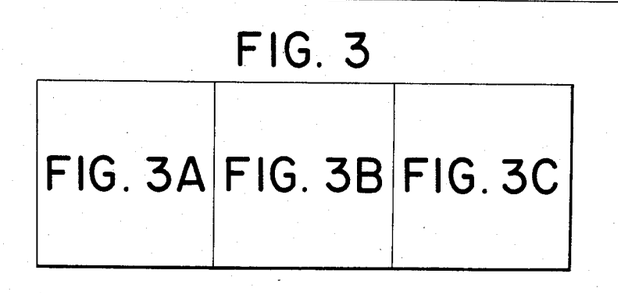
FIG. 3, including 3A–3C, is a block diagram showing an embodiment of the present invention.
Figure 3A:
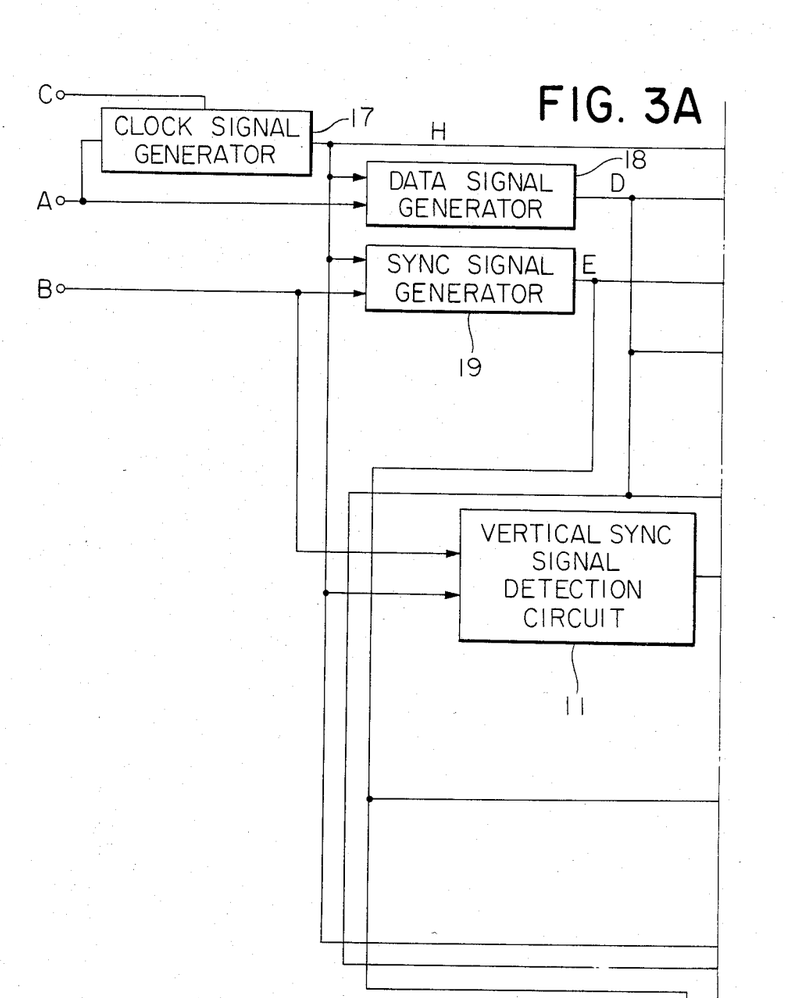
Figure 3B:
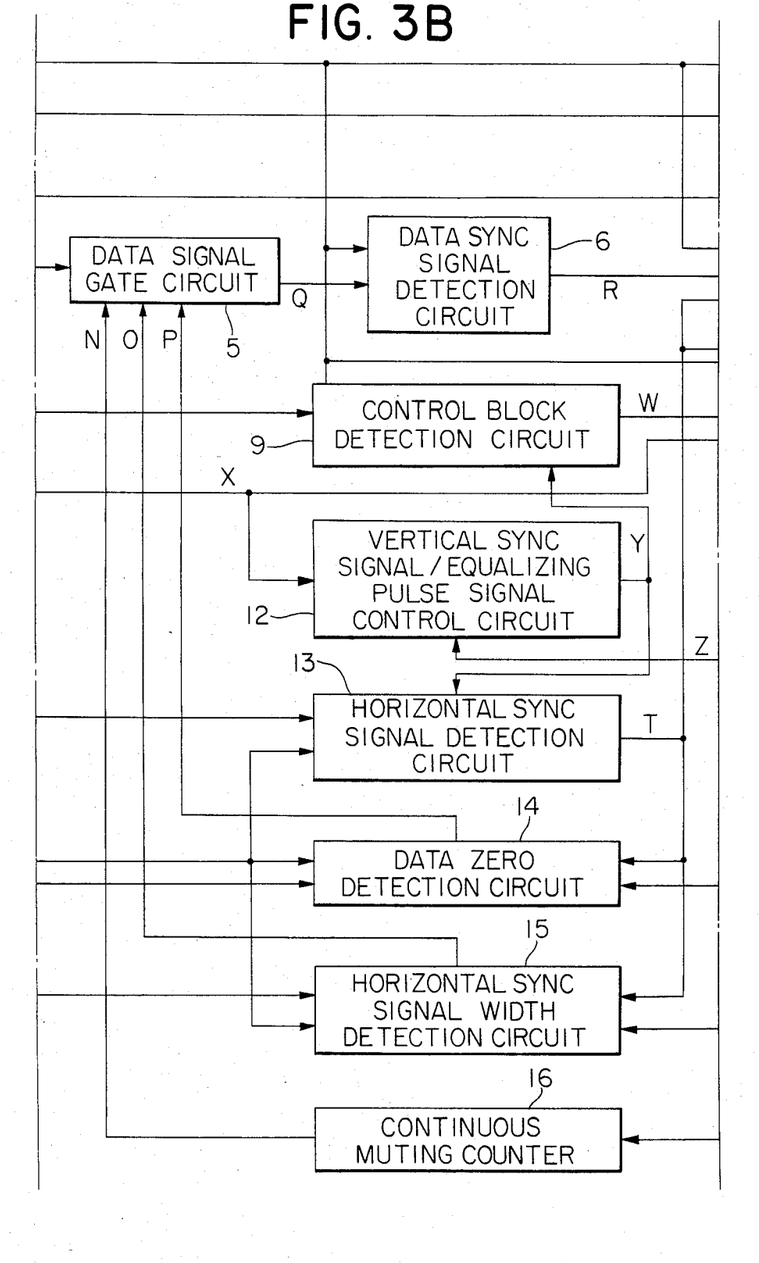
Figure 3C:
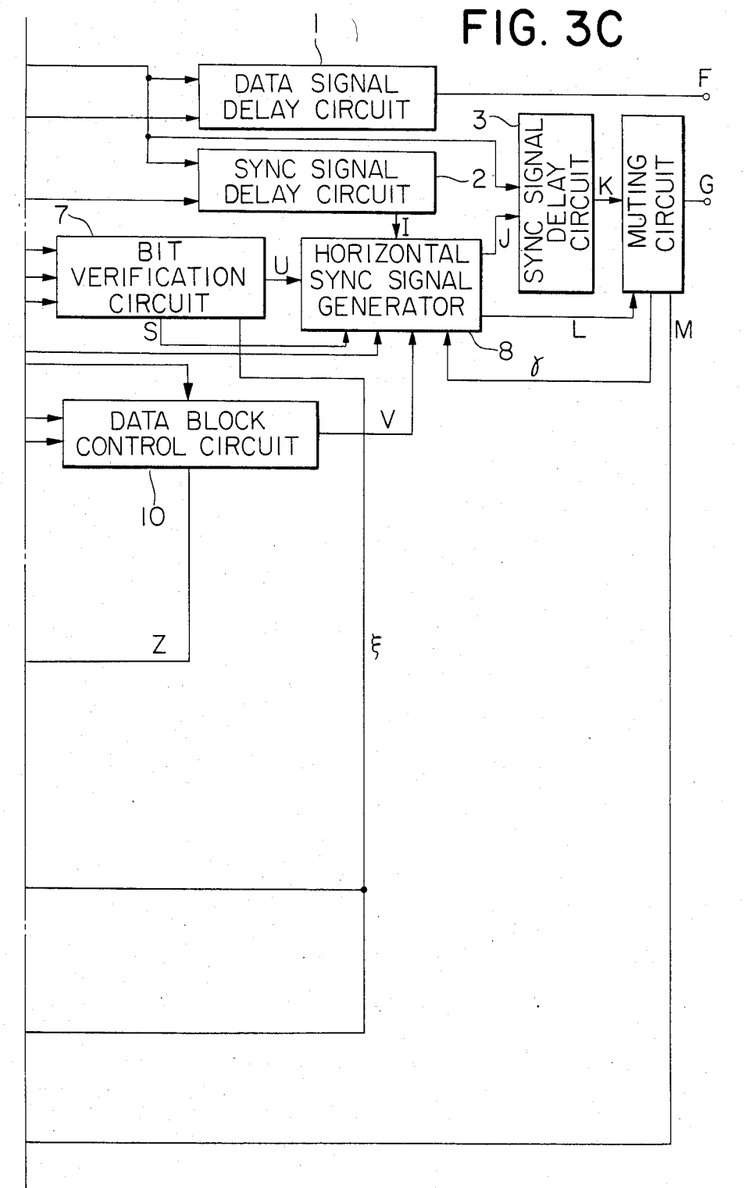

FIG. 3 shows a general arrangement of an embodiment of the present invention and FIGS. 4 through 18 show schematic circuit diagrams of the respective blocks shown in FIG. 3. The inventive circuit arrangement will be described with reference to FIGS. 3 through 18.

In FIG. 3, an input terminal A receives the data signal shown in FIG. 2B, an input terminal B receives the sync signal shown in FIG. 2C, and an input terminal C receives the master clock signal. A clock signal generator 17 provides a clock signal H for latching the PCM signal in response to the data signal received at the input terminal A and the master clock signal received at the input terminal C, a data signal generator 18 provides a digitized data signal D by latching the data signal received at the input terminal A in accordance with the clock signal H, and a sync signal generator 19 provides a digitized sync signal E by latching the sync signal received at the input terminal B in accordance with the clock signal H.

Figure 4:
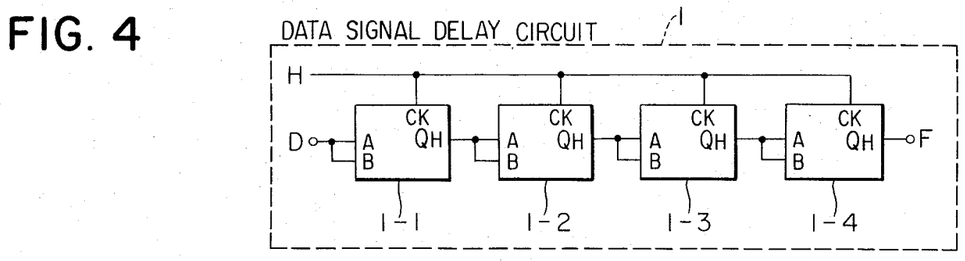
FIGS. 4 through 18 are schematic diagrams in the respective blocks shown in FIG. 3.

A data signal delay circuit 1 receives the data signal D and clock signal H for delaying the data signal D for the specified number of bits and sends the output signal through an output terminal F to the succeeding digital signal processing circuitries (not shown). The data signal delay circuit 1 is made up of a tandem serial connection of 8-bit shift registers 1-1, 1-2, 1-3 and 1-4 as shown in FIG. 4, and operates to delay the data signal D for the specified number of bits by receiving the clock signal H at a clock terminal CK of each shift register.

Figure 5:
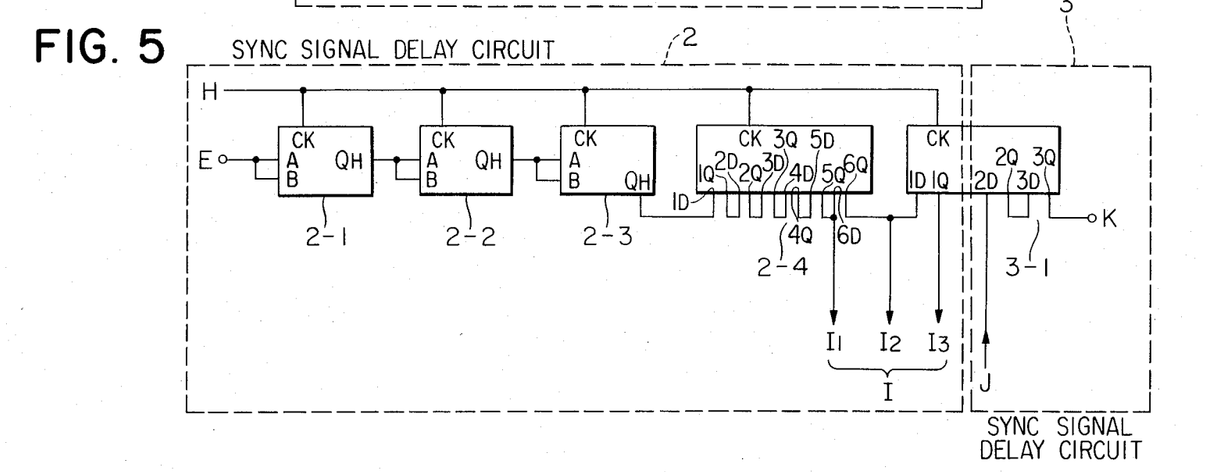

A sync signal delay circuit 2 receives the sync signal E and a clock signal H for delaying the sync signal E for the specified number of bits, and provides an output signal I for a horizontal sync signal generator 8 which will be described later. Another sync signal delay circuit 3 receives an output signal J of the horizontal sync signal delay circuit 8 and the clock signal H, and operates to delay the signal J for the specified number of bits. These sync signal delay circuits 2 and 3 are each made up of a tandem serial connection of 8-bit shift registers 2-1, 2-2 and 2-3 and D-type flip-flops 2-4 and 3-1 as shown in FIG. 5, and provides the output signals I ($I_1$, $I_2$ and $I_3$) and an output signal K at respective output terminals by receiving the clock signal H at clock terminals CK of the shift registers and flip-flops and the sync signal E at the input terminals A and B of the shift register 2-1. Although two sync signal delay circuits 2 and 3 are used in this embodiment, they constitute a single sync signal delay means as a whole. Anyhow, the data signal delay circuit 1 and the sync signal delay circuits 2 and 3 are provided with an equal number of delay bits so that the data signal and sync signal are delayed by a time length necessary for the error retrieval operation for the horizontal sync signal as will be described later.

A muting circuit 4 receives the horizontal sync signal K from the sync signal delay circuit 3, and operates to conduct or block the signal K in response to a muting control signal L provided by the horizontal sync signal generator 8 (this circuit also serves as a muting control signal generator as will be described later). The muting circuit 4 provides an output signal, which is sent through an output terminal G to the succeeding digital signal processing circuitries so that it is used for reproducing the data signal sent from the above-mentioned output terminal F. The muting circuit 4 operates so that when the horizontal sync signal deviates from the normal timing in respect to the timing relationship with the data signal, the false horizontal sync signal is blocked so that it is not delivered to the digital signal processing circuitries, otherwise the acceptable horizontal sync signal or the retrieved horizontal sync signal is delivered to the digital signal processing circuitries.

Figure 6:
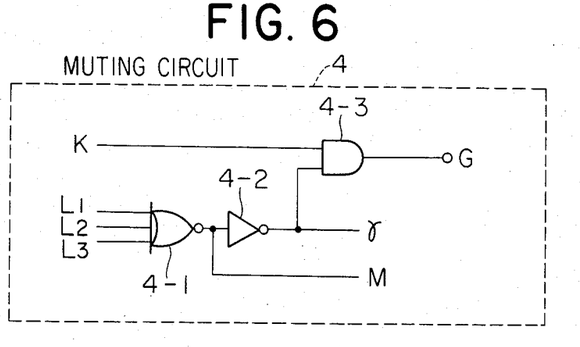

As shown in FIG. 6, the muting circuit 4 is made up of a NOR gate 4-1 which receives the output signals L ($L_1$, $L_2$ and $L_3$) from the horizontal sync signal generator 8, an inverter 4-2 which provides logical inversion for the output of the NOR gate 4-1, and an AND gate 4-3 which receives the sync signal K from the sync signal delay circuit 3 and the output of the inverter 4-2, and these gates 4-1, 4-2 and 4-3 provide output signals G, $\gamma$ and M, respectively.

Figure 7:
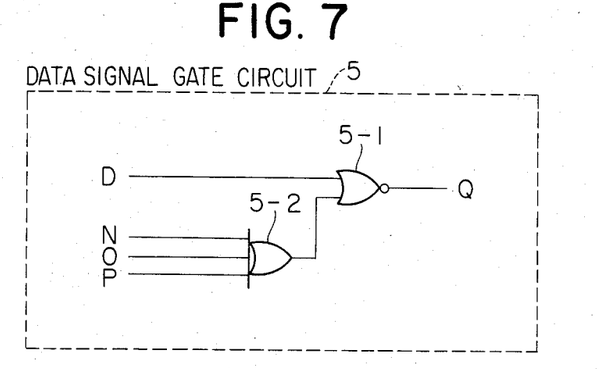

A data signal gate circuit 5 receives an output signal P of a data zero detection circuit 14, an output signal O of a horizontal sync signal width detection circuit 15, and an output signal N of a continuous muting counter 16, and operates to conduct or block the data signal D. The data signal gate circuit 5 is made up of a NOR gate 5-1 and an OR gate 5-2 as shown in FIG. 7, and operates to block the data signal D at the NOR gate 5-1 when any one of the output signals P, O and N is not available at the OR gate 5-2. In other words, the data signal is verified by the horizontal sync signal width detection circuit 15 whether it has the 13-bit horizontal sync signal (period from i to j) and also checked by the data zero detection circuit 14 whether it contains no data in the period after the leading edge of the horizontal sync signal (at i) and immediately before the data sync signal as stated in the PCM signal formats shown in FIGS. 2A, 2B and 2C. And if these items comply with the formats, the data signal gate circuit 5 becomes conductive to pass the data signal D to the following circuit for the detection of the data sync signal, otherwise the data signal D is blocked here. The continuous muting counter 16 operates to make the data signal gate circuit 5 conductive basing on a signal M from the muting circuit 4, so that it does not block the data signal D continuously.

The data zero detection circuit 14, the horizontal sync signal width detection circuit 15 and the continuous muting counter 16 in combination constitute a PCM signal format verification means which verifies that the incoming PCM signal complies with the PCM signal format based on the data signal and the sync signal received. The circuits 14, 15 and 16 are arranged as shown in FIGS. 16, 17 and 18, respectively.

Figure 16:
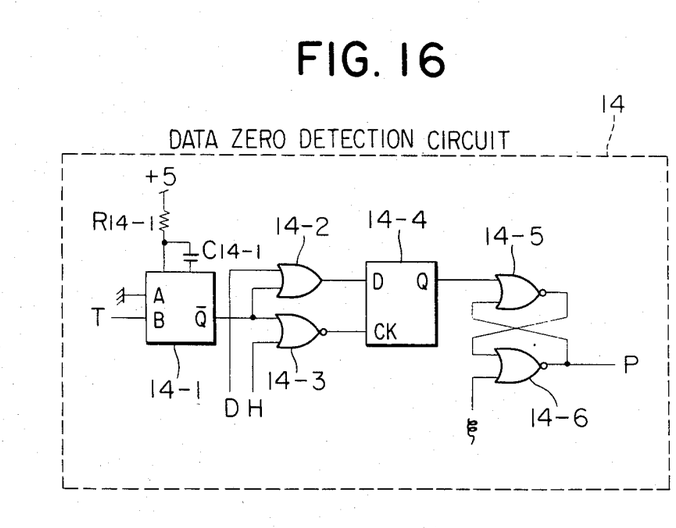

The arrangement of FIG. 16 includes a monostable multivibrator 14-1, a resistor capacitor pair $R_{14-1}$ and $C_{14-1}$ for establishing the operating pulse width of the multivibrator, an OR gate 14-2, a NOR gate 14-3, a D-type flip-flop 14-4, and a pair of NOR gates 14-5 and 14-6 forming a latch.

Figure 17:
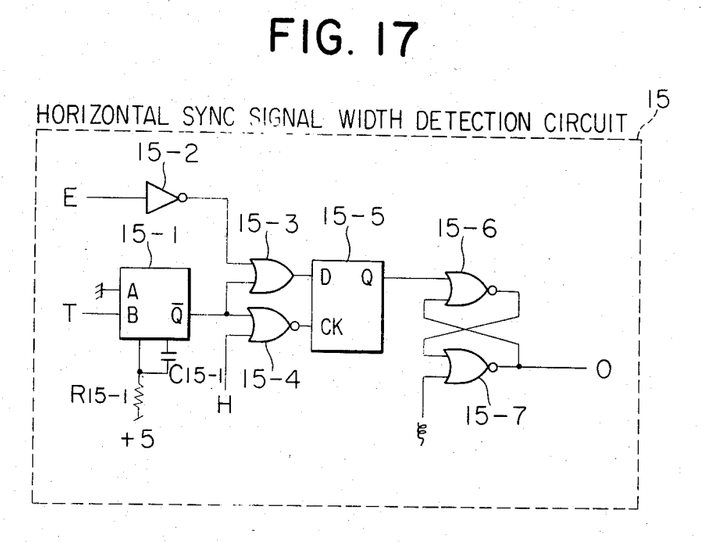

The arrangement of FIG. 17 includes a monostable multivibrator 15-1, a resistor capacitor pair $R_{15-1}$ and $C_{15-1}$ for establishing the pulse width of the multivibrator, an inverter 15-2, an OR gate 15-3, a NOR gate 15-4, a D-type flip-flop 15-5, and a pair of NOR gates 15-6 and 15-7 forming a latch.

Figure 18:
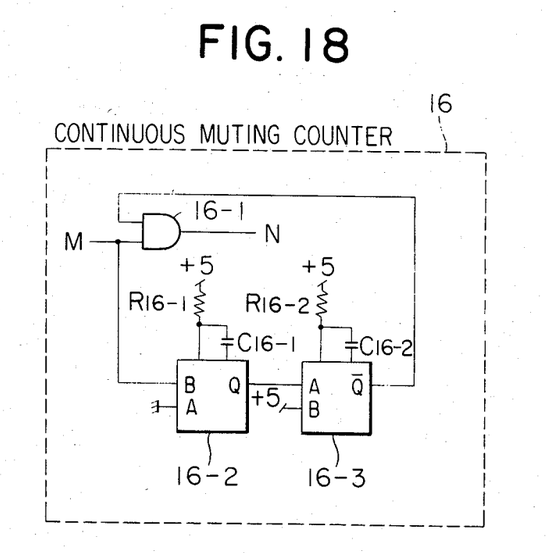

The arrangement of FIG. 18 includes an AND gate 16-1, monostable multivibrators 16-2 and 16-3, and resistor capacitor pairs $R_{16-1}$ and $C_{16-1}$, and $R_{16-2}$ and $C_{16-2}$.

Figure 8:
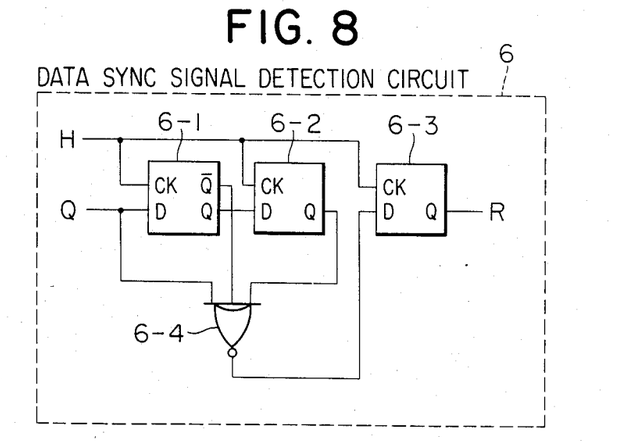

The data sync signal detection circuit 6 (FIG. 3) detects the data sync signal ("1010") in an output signal Q from the data signal gate circuit 5, and is made up of D-type flip-flops 6-1 through 6-3 and a NOR gate 6-4 as shown in FIG. 8.

A bit verification circuit 7 for verifying the timing relationship between the horizontal sync signal and the data sync signal receives the clock signal H, a data sync signal R provided by the data sync signal detection circuit 6, and a horizontal sync signal T provided by a horizontal sync signal detection circuit 13, and verifies that the horizontal sync signal and the data sync signal are spaced (from i to m, or j to m) by the specified number of bits and, when this fails, determines quantitatively how much the timing relationship deviates from the normal state.

Figure 9:
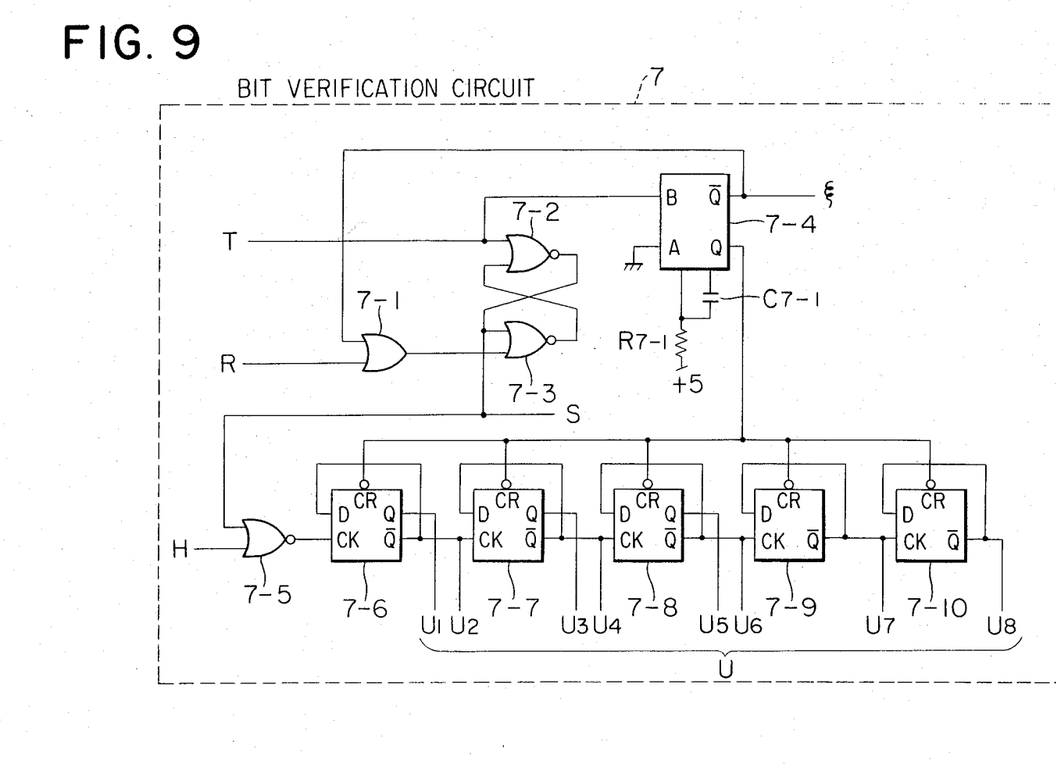

As shown in FIG. 9, the bit verification circuit 7 is made up of an OR gate 7-1, a pair of NOR gates 7-2 and 7-3 forming a latch, a monostable multivibrator 7-4, a resistor capacitor pair $R_{7-1}$ and $C_{7-1}$ for establishing the pulse width of the multivibrator, a NOR gate 7-5, and D-type flip-flops 7-6 through 7-10. The flip-flops 7-6 through 7-10 constitute a counter, which provides count outputs $U_1$ through $U_8$ to be delivered to the horizontal sync signal generator 8.

Figure 10:
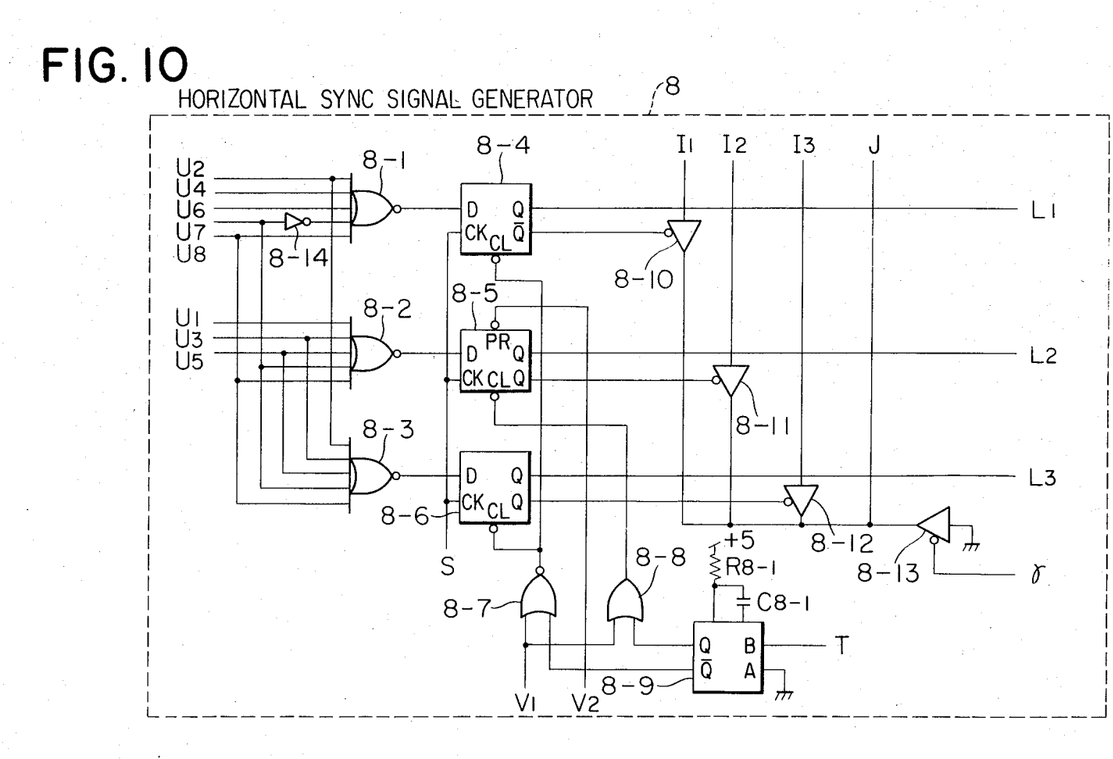

The horizontal sync signal generator 8 operates in accordance with the determination result made by the bit verification circuit 7, and provides a normal horizontal sync signal J when the timing relationship has been determined to be correct or provides a retrieved horizontal sync signal J when it has been incorrect. The circuit 8 capable of retrieving the horizontal sync signal in the range of ±1 bit can be arranged as shown in FIG. 10. In this embodiment, as mentioned previously, the horizontal sync signal generator 8 also serves to generate the muting control signals L ($L_1$, $L_2$ and $L_3$).

The arrangement of FIG. 10 includes NOR gates 8-1, 8-2 and 8-3 which receive signals U ($U_1$ through $U_8$) from the verification circuit 7 and detect that the horizontal sync signal is mistimed by +1 bit from the normal point, the signal is present timely (mistimed by 0 bit), and the signal is mistimed by −1 bit, respectively. The arrangement further includes D-type flip-flops 8-4 through 8-6, a NOR gate 8-7, an OR gate 8-8, a monostable multivibrator 8-9, a resistor capacitor pair $R_{8-1}$ and $C_{8-1}$ for establishing the pulse width of the multivibrator, 3-state buffers 8-10 through 8-13, and an inverter 8-14.

Figure 11:
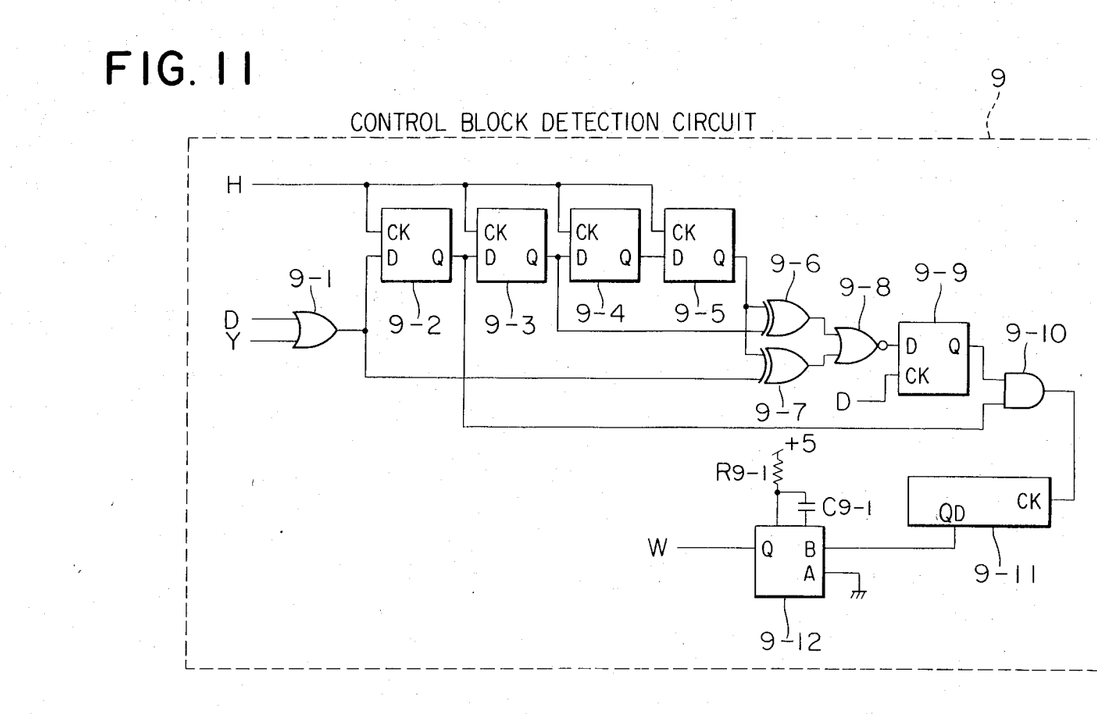

A control block detection circuit 9 receives the clock signal H, the data signal D and an output Y from a vertical sync signal/equalizing pulse signal control circuit 12 which will be described later, and operates to detect the control block shown in FIG. 1. As shown in FIG. 11, the arrangement of the circuit 9 includes D-type flip-flops 9-2 through 9-5 and 9-9, a 4-bit shift register 9-11, a monostable multivibrator 9-12, a resistor capacitor pair $R_{9-1}$ and $C_{9-1}$ for establishing the pulse width of the multivibrator, an OR gate 9-1, exclusive-OR gates 9-6 and 9-7, a NOR gate 9-8, and an AND gate 9-10.

Figure 12:
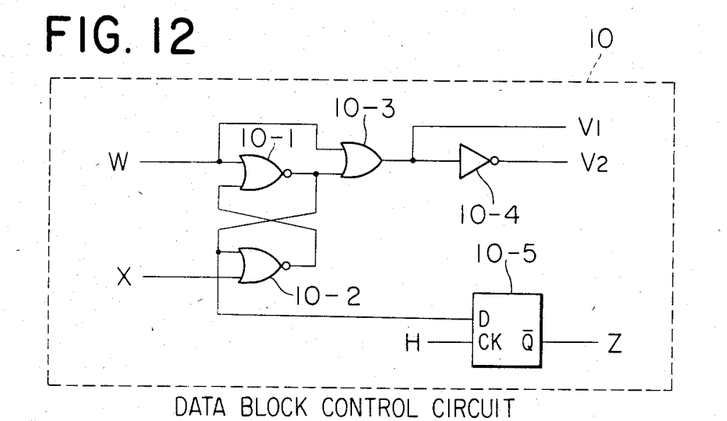

A data block control circuit 10 receives an output W from the control block detection circuit 9, the clock signal H, and a vertical sync signal X from a vertical sync signal detection circuit 11, and provides a control signal V for the horizontal sync signal generator 8 and a control signal Z for the control circuit 12. As shown in FIG. 12, the circuit 10 is made up of a pair of NOR gates 10-1 and 10-2 forming a latch, an OR gate 10-3, an inverter 10-4, and a D-type flip-flop 10-5. The horizontal sync signal is subjected to the retrieval operation only during a sequence of the data block shown in FIG. 1, and thus the purpose of a circuit comprising the control block detection circuit 9 and the data block control circuit 10 is to allow the retrieval operation only during the period of the data block, thereby to prevent malfunctioning of the horizontal sync signal generator 8.

Figure 13:
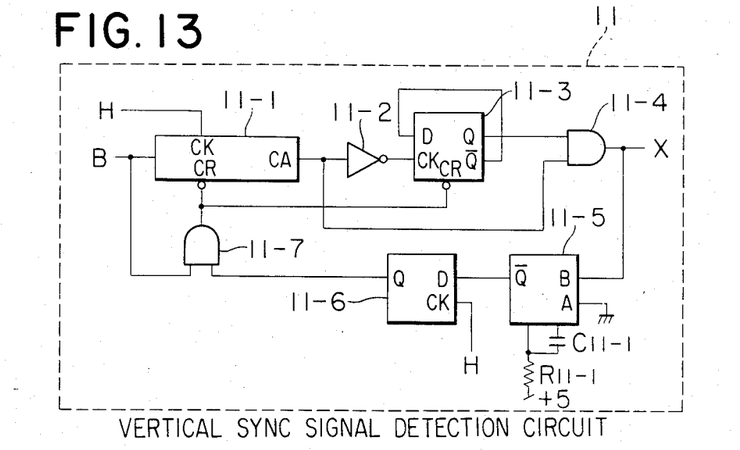

The vertical sync signal detection circuit 11 detects the vertical sync signal to determine the duration of the vertical sync signal section shown in FIGS. 1C and 1D, and provides the vertical sync signal X. As shown in FIG. 13, the circuit 11 is made up of a 4-bit counter 11-1, an inverter 11-2, D-type flip-flops 11-3 and 11-6, AND gates 11-4 and 11-7, a monostable multivibrator 11-5, and a resistor capacitor pair $R_{11-1}$ and $C_{11-1}$ for establishing the pulse width of the multivibrator.

Figure 14:
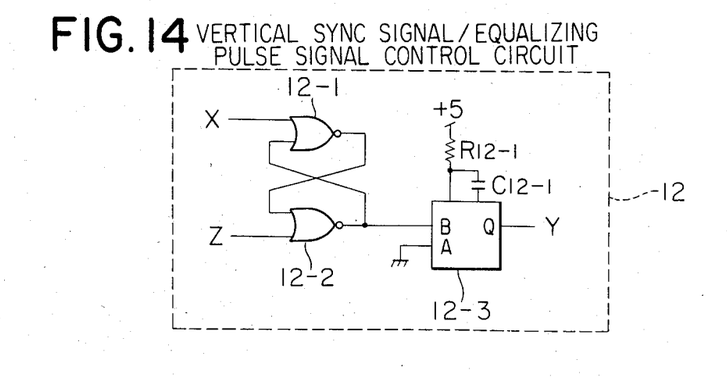

The vertical sync signal/equalizing pulse signal control circuit 12 detects the vertical sync signal and the equalizing pulse signal shown in FIG. 1, and provides the output signal Y for controlling the control block detection circuit 9 and the horizontal sync signal detection circuit 13. As shown in FIG. 14, the circuit 12 is made up of a pair of NOR gates 12-1 and 12-2 forming a latch, a monostable multivibrator 12-3, and a resistor capacitor pair $R_{12-1}$ and $C_{12-1}$ for establishing the pulse width of the multivibrator.

Figure 15:
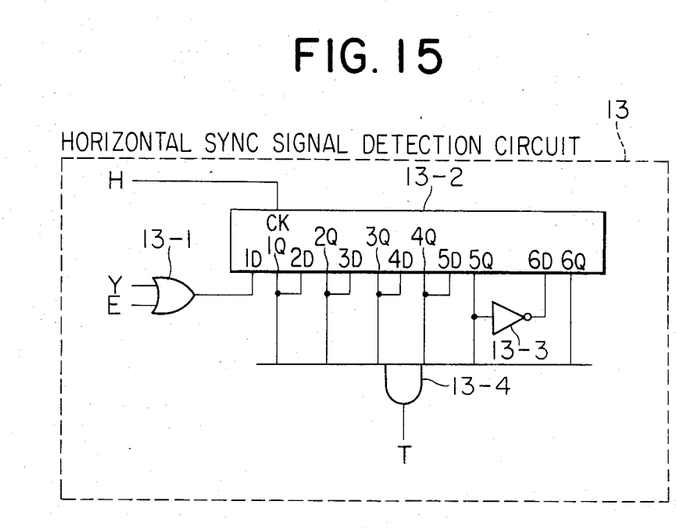

The horizontal sync signal detection circuit 13 detects the horizontal sync signal shown in FIG. 2 and provides the horizontal sync signal detection output T for the verification circuit 7, the data zero detection circuit 14, the horizontal sync signal width detection circuit 15, and the horizontal sync signal generator 8. As shown in FIG. 15, the circuit 13 comprises an OR gate 13-1, a shift register 13-2, an OR gate 13-4 which takes logical sum for the outputs of the shift register, and an inverter 13-3.

The following will describe the operation of the foregoing arrangement embodying the present invention.

The data signal and the sync signal received at the input terminals A and B are supplied to the data signal delay circuit 1 and the sync signal delay circuit 2, respectively, so that they are delayed for the specified time length. The delayed data signal D is delivered, on the one hand, to the NOR gate 5-1 in the data signal gate circuit 5, which receives the outputs N, O and P at "0" level when the PCM signal format verification means 14, 15 and 16 has determined such that the incoming signal complies with the PCM signal format, then the OR gate 5-2 provides a "0" output. Then the NOR gate 5-1 is satisfied to pass the data signal D as the output Q. When any one of the outputs N, O and P is "1", the data signal D is blocked by the NOR gate 5-1.

The output Q of the data signal gate circuit 5 is delivered to the D-type flip-flop 6-1 in the data sync signal detection circuit 6, as shown in FIG. 8, in which the three D-type flip-flops 6-1 through 6-3 and the NOR gate 6-4 operate in association to detect the data sync signal ("1010") in the input data signal Q and provide the data sync signal R.

The data sync signal R is delivered to the OR gate 7-1 in the verification circuit 7 shown in FIG. 9, and the NOR gate 7-5 is allowed to pass the clock signal H to the counters (7-6 through 7-10) during the period from the leading edge of the horizontal sync signal T provided by the horizontal sync signal detection circuit 14 to the entry of the data sync signal R, thereby to measure the period from the arrival of the horizontal sync signal T to the data sync signal R. The count is represented by the signals U ($U_1$ through $U_8$). A signal ε is issued a certain elapsing time following the horizontal sync signal T, i.e., after the time period in which the "1010" data sync signal is to be detected, so as to clear the counters 7-6 through 7-10.

The output signals U of the bit verification circuit 7 are sent to the horizontal sync signal generator 8 shown in FIG. 10, in which the NOR gate 8-1 detects that the horizontal sync signal deviates by −1 bit from the normal PCM format, the NOR gate 8-2 detects that the sync signal is normal, and the NOR gate 8-3 detects that the sync signal deviates by +1 bit from the normal PCM format. The outputs of the NOR gates 8-1 through 8-3 are latched by the flip-flops 8-4 through 8-6 in response to a signal S supplied to the clock inputs of the flip-flops. The signal S is produced in the circuit of FIG. 9, and it goes from "0" to "1" when the data sync signal R is given.

In more detail, for example, when the horizontal sync signal deviates by −1 bit, the NOR gate 8-1 outputs "1", while the NOR gates 8-2 and 8-3 output "0", causing the flip-flop 8-4 to output $\overline{Q}$="0". Then, the 3-state buffer 8-10 is enabled to put the signal $I_1$ on the path of the signal J. Of course, at this time, the flip-flops 8-5 and 8-6 both retain $\overline{Q}=$"1", the 3-state buffers 8-11 and 8-12 are made non-conductive in a high-impedance state. In addition, the deviation of the horizontal sync signal by $-1$ bit causes the NOR gate 4-1 in FIG. 6 to receive $L_1=$"1", that makes M="0" and then $\gamma=$"1", thus the 3-state buffer 8-13 is non-conductive. Similarly, when the horizontal sync signal has no deviation (i.e., normal), the signal $I_2$ is put on the path of signal J, and when the sync signal deviates by $+1$ bit, the signal $I_3$ is sent out as signal J. The NOR gate 8-7 and the OR gate 8-8 produce signals to be applied to the clear terminals and the preset terminals, respectively, of the flip-flops 8-4 through 8-6.

The signal J thus produced by the horizontal sync signal generator 8 is delivered to the sync signal delay circuit 3 shown in FIG. 5, in which the signal is delayed by the D-type flip-flop 3-1 and then sent out as the signal K. The signal K is applied to one input terminal of the AND gate 4-3 shown in FIG. 6.

The signals $L_1$, $L_2$ and $L_3$ produced in FIG. 10 are applied to input terminals of the NOR gate 4-1 in the muting circuit 4 shown in FIG. 6. When any of $L_1$, $L_2$ and $L_3$ is "1", i.e., the horizontal sync signal is normal or deviates within $\pm 1$ bit relative to the data signal, the NOR gate 4-1 provides M="0". Then, the signal $\gamma$ is "1", causing the AND gate 4-3 to conduct the normal or retrieved horizontal sync signal K as the output signal G. On the other hand, when the signals $L_1$, $L_2$ and $L_3$ are all "0", i.e., the horizontal sync signal deviates by $\pm 2$ bits or more, the signal M becomes "1" and the signal $\gamma$ "0", causing the signal G to remain at "0", and the signal K is blocked.

In the control block detection circuit 9 shown in FIG. 11, the OR gate 9-1 receives the data signal D from the data signal generator 18 and the signal Y from the vertical sync signal/equalizing pulse signal control circuit 12, and the flip-flops 9-2 through 9-5 and 9-9 and the gates 9-6, 9-7, 9-8 and 9-10 in association operate to detect the "1100" bit pattern included in the control block as stated in the PCM format. Then, the repetitive "1100" bit patterns are detected by the counter 9-11, which provides the output for the monostable multivibrator 9-12 to obtain the output signal W.

In FIG. 12, the data block control circuit 10 receives the above-mentioned signal W from the control block detection circuit 9 and the output X of the vertical sync signal detection circuit 11, and these signals are latched exclusively by the flip-flop formed by the NOR gates 10-1 and 10-2. The OR gate 10-3 provides the output signal $V_1$ directly and the output signal $V_2$ through the inverter 10-4, and when the system receives a vertical sync signal, the circuit 10 receives X="1", causing the outputs to become $V_1=$"1" and $V_2=$"0". This output state will last until the signal W comes so that the horizontal sync signal generator 8 shown in FIG. 10 operates solely in the PCM data signal section of the PCM signal received.

In FIG. 13, the vertical sync signal detection circuit 11 receives the sync signal B (may be replaced with the signal E provided by the sync signal generator 19) and detects the vertical sync signal by counting events of "0" of the signal shown in FIGS. 1C and 1D using a counter 11-1. Once the vertical sync signal is detected, the counter operation is suspended by an arrangement of a monostable multivibrator 11-5, a D-type flip-flop 11-6 and an AND gate 11-7 in combination.

In FIG. 14, the vertical sync signal/equalizing pulse signal control circuit 12 receives the output signal X of the vertical sync signal detection circuit 11 and the output signal of the data block control circuit 9, and provides signal Y which is timed by the signal X and provided with a certain duration.

In the horizontal sync signal detection circuit 13 shown in FIG. 15, an OR gate 13-1 receives the above-mentioned signal Y and the sync signal E, and provides an output for a shift register 13-2, which measures the duration of the horizontal sync signal basing on the clock signal H and provides the horizontal sync signal detection output T. During the data block period, the signal Y is "0" and the circuit does not operate.

In the data zero detection circuit 14 shown in FIG. 16, the horizontal sync signal detection output pulse T triggers a monostable multivibrator 14-1 so that it provides an output at $\overline{Q}$ until bit point $m_1$ shown in FIG. 2. During that period, if data is absent, an OR gate 14-2 which receives the data signal D retains "0" and a D-type flip-flop 14-4 outputs Q="0" in response to the clock signal H. After that, the circuit 14 is supplied with the data sync signal detection signal from the verification circuit 7 shown in FIG. 9. In consequence, when data is absent during the period from the issue of the horizontal sync signal detection output T to the output of the verification circuit, the output P becomes "0", or when the data signal has the portion of "1" in that period, the D-type flip-flop 14-4 provides Q="1", causing the output P to become "1".

In the horizontal sync signal width detection circuit 15 shown in FIG. 17, a monostable multivibrator 15-1 provides output $\overline{Q}=$"0" after the horizontal sync signal detection output T has been issued (at point i) and until point j as shown in FIG. 2, so that the sync signal E and the clock signal H are applied to a flip-flop 15-5 through an OR gate 15-3 and a NOR gate 15-4, respectively, during that period. If the sync signal E maintains "0" during the period from i to j, the D-type flip-flop 15-5 receives "0" at the D input, and the output O goes "0" while the signal is being supplied. On the other hand, when the horizontal sync signal is short of the width for the period from i to j, making an earlier transition to "1", the D-type flip-flop 15-5 receives "1" at the D input, resulting in the output of O="1". Although in this embodiment, the duration of the horizontal sync signal is verified with reference to the period from i to j, there is no practical problem in setting the reference period a few bits shorter.

In the continuous muting counter 16 shown in FIG. 18, a monostable multivibrator 16-3 is triggered by the positive signal M from the muting circuit 4 shown in FIG. 6, and then it is restored to $\overline{Q}=$"0" after one horizontal signal period approximately. Then, the output N will be "0" in the subsequent horizontal signal period. Accordingly, even if the muting circuit 4 provides two positive ("1") outputs M successively, the signal N goes "1" only during the first horizontal signal period and remains at "0" in the second horizontal signal period.

In the foregoing embodiment, the retrieval of the horizontal sync signal is carried out when it deviates by $+1$ bit or $-1$ bit relative to the data sync signal, and the muting operation takes place when the horizontal sync signal deviates by $\pm 2$ bits or more. However, the retrieval for a deviation of more than $\pm 1$ bit can readily be carried out by providing, for example, an increased number of NOR gates in addition to those 8-1 through 8-3 and correspondingly an increased number of D-type flip-flops in addition to those 8-4 through 8-6 in the arrangement of FIG. 10. Such a modification of circuit will be apparent to those skilled in the art and explanation thereof will be omitted.

In the foregoing embodiment, the PCM signal is assumed to conform to the television signal standard of NTSC system having 525 scanning lines. However, it will be appreciated that the present invention is also applicable to PAL and SECAM systems having 625 scanning lines.

According to the present invention, as described above, the timing relationship between the horizontal sync signal and the data signal is verified, and when the horizontal sync signal is determined to be correct, it is directly transferred to the signal processing system; when the horizontal sync signal is determined to be false within a certain allowable range, it is retrieved and transferred to the signal processing system; and when the horizontal sync signal is determined to be false in excess of the range, it is eliminated from the reproduction signal, whereby noise caused by a disturbed horizontal sync signal can be prevented perfectly in reproducing the PCM signal and a very high quality signal reproduction is achieved.

We claim:

1. A horizontal sync pulses control circuit for a video tape recorder for modulating and analog audio signal to a pulse code modulation("PCM") signal conforming to a television signal standard, and recording said PCM signal on and reproducing said PCM signal from a video tape by means of a head of said video tape recorder, wherein said horizontal sync pulse control circuit comprises:
   a data signal delay means for delaying a data signal which is obtained by slicing said PCM signal at a first level and which consists of a data sync signal and a PCM data signal;
   a sync signal delay means for delaying a sync signal which is obtained by slicing said PCM signal at a second level and which consists of a horizontal sync signal and a vertical sync signal;
   a muting means provided at the output of said sync signal delay means; and
   a verification means for receiving the data signal and the sync signal in said PCM signal and verifying that said PCM signal complies with a predetermined format, said verification means comprising:
      a detection means for detecting the timing relationship between the horizontal sync signal and the data signal in said PCM signal,
      a selective signal transfer means operatively associated with said muting means for transferring the output of said sync signal delay means to the succeeding circuit when (i) the timing relationship between the horizontal sync signal and the data signal in said PCM signal coincides with the predetermined formal and when (ii) said relationship differs from said format by a degree within a predetermined range, and for causing said muting means to block the output of said sync signal delay means when said relationship differs from said formal by a degree in excess in said range, and
      a horizontal sync signal generating means for retrieving the horizontal sync signal when the timing relationship between the horizontal sync signal and the data signal in said PCM signal differs from said data format by a degree within said predetermined range and supplies said retrieved horizontal sync signal to said synce signal delay means.

2. A horizontal sync pulse control circuit according to claim 1, wherein said verification means further comprises a data signal gate means which is located in a path of the data signal in said PCM signal and operates to conduct or block the data signal in response to the output of said detection means.

3. A horizontal sync pulse control circuit according to claim 2, wherein said verification means further comprises a data sync signal detection means which detects a data sync signal having a logical expression of "1010" in the output of said data signal gate means.

4. A horizontal sync pulse control circuit according to claim 3, wherein said verification means further comprises a bit verification means which receives the data sync signal detected by said data sync signal detection means, the clock signal and the horizontal sync signal and operates to verify the number of bits spacing between the horizontal sync signal and the data sync signal.

5. A horizontal sync pulse control circuit according to claim 4, wherein said bit verification means comprises a gate means which receives the clock signal during a period from an actual horizontal sync signal to a data sync signal; a counter for counting said clock signal; and a means which clears said counter upon expiration of a time length between the horizontal sync signal and the data sync signal based on said format after said counter has started counting, said bit verification means verifying the number of bits between the actual horizontal sync signal and the data sync signal basing on the result of count immediately before said counter is cleared.

6. A horizontal sync pulse control circuit according to claim 1, wherein said detection means comprises a data zero detection means which detects that said PCM signal maintains logical "0" during a period between the horizontal sync signal and the data sync signal as stated in said format and provides a predetermined logical output if said condition is met; a horizontal sync signal width detection means which verifies that the horizontal sync signal has a width as stated in said format and provides a predetermined logical output if said condition is met; and a continuous muting counter means which receives a predetermined logical input during a period when said muting means is being controlled to block the output of said sync signal delay means and conducts said logical input only in the first horizontal signal period in said period and blocks said logical input in a remaining portion of said horizontal signal period.

7. A horizontal sync pulse control circuit according to claim 6, wherein said data zero detection means comprises a logic circuit which receives the horizontal sync signal and the data signal to verify basing on the clock signal that the data signal maintain logical "0" during a period from the horizontal sync signal to the data sync signal in the data signal and provides a predetermined logical output when said condition is met so that said logical output is reversed upon expiration of a time length from the horizontal sync signal to the data sync signal based on said format.

8. A horizontal sync pulse control circuit according to claim 6, wherein said horizontal sync signal width detection means comprises a logic circuit which receives an actual horizontal sync signal and the clock signal to verify that said actual horizontal sync signal maintains logical "0" during a period of the horizontal sync signal width stated in said format after said actual horizontal sync signal has fallen and provides a predetermined logical output when said condition is met.

9. A horizontal sync pulse control circuit according to claim 6, wherein said continuous muting counter means comprises a gate circuit which receives a predetermined logical input during a period when said muting means is controlled to block the output of said sync signal delay means; and a delay circuit for delaying said logical input for a predetermined time length, said gate circuit being controlled by the output of said delay circuit so that said gate circuit conducts said logical input only during the first horizontal signal period in said period and blocks said logical input in a remaining horizontal signal period.

10. A horizontal sync pulse control circuit according to claim 1, wherein said horizontal sync signal generating means comprises a plurality of logic circuits which are activated when the horizontal sync signal and the data sync signal are spaced by a predetermined number of bits with an allowance of deviation of $\pm n$ ($n = 1, 2, 3, \ldots$) bits and a plurality of gate circuits controlled by the outputs of said logic circuits, one of said gate circuits being made conductive by a corresponding logic circuit in accordance with the number of bits of said deviation so that a signal received at the input of said gate circuit is outputted as a retrieved horizontal sync signal.

* * * * *